United States Patent [19]

Flint et al.

[11] Patent Number: 5,364,683
[45] Date of Patent: Nov. 15, 1994

[54] COMPRESSIBLE PRINTING BLANKET AND METHOD OF MAKING SAME

[75] Inventors: W. Toriran Flint, Spartanburg; Joseph L. Byers, Inman, both of S.C.

[73] Assignee: Reeves Brothers, Inc., Spartanburg, S.C.

[21] Appl. No.: 835,795

[22] Filed: Feb. 14, 1992

[51] Int. Cl.⁵ .......................... B32B 5/16; B32B 3/26; B32B 7/12; B32B 5/22
[52] U.S. Cl. .................................. 428/141; 428/241; 428/250; 428/258; 428/306.6; 428/313.3; 428/317.1; 428/317.9; 428/909
[58] Field of Search ............... 428/909, 141, 241, 250, 428/258, 306.6, 313.3, 317.1, 317.9

[56] References Cited

U.S. PATENT DOCUMENTS

| | | | |
|---|---|---|---|
| 3,033,709 | 5/1962 | Brown | 117/161 |
| 3,147,698 | 9/1964 | Ross | 101/149.2 |
| 3,219,600 | 11/1965 | Rucker | 260/2.5 |
| 3,418,864 | 12/1968 | Ross | 74/232 |
| 3,479,811 | 11/1969 | Walters | 37/153 |
| 3,486,968 | 12/1969 | Mater | 161/190 |
| 3,616,145 | 10/1971 | Clifton | 161/87 |
| 3,673,023 | 6/1972 | Ross | 156/137 |
| 3,700,541 | 10/1972 | Shrimpton et al. | 161/160 |
| 3,795,568 | 3/1974 | Rhodarmer et al. | 161/87 |
| 3,983,287 | 9/1976 | Goossen et al. | 428/241 |
| 4,015,046 | 3/1977 | Pinkston et al. | 428/422 |
| 4,025,685 | 5/1977 | Haren et al. | 428/304 |
| 4,042,743 | 8/1977 | Larson et al. | 428/306 |
| 4,086,386 | 4/1978 | Gaworowski et al. | 428/307 |
| 4,093,487 | 6/1978 | Gaworowski et al. | 166/244.16 |
| 4,093,764 | 6/1978 | Duckett et al. | 428/113 |
| 4,303,721 | 12/1981 | Rodriguez | 428/213 |
| 4,422,895 | 12/1983 | Shimura et al. | 156/633 |
| 4,471,011 | 9/1984 | Sporing | 428/68 |
| 4,548,858 | 10/1985 | Meadows | 428/224 |
| 4,751,127 | 6/1988 | Pinkston et al. | 428/141 |
| 4,770,928 | 9/1988 | Gaworowski et al. | 428/284 |
| 4,812,357 | 3/1989 | O'Rell et al. | 428/240 |
| 4,981,750 | 1/1991 | Murphy et al. | 428/220 |
| 5,001,208 | 3/1991 | Ross et al. | 528/61 |
| 5,006,400 | 4/1991 | Pinkston et al. | 428/229 |
| 5,013,811 | 5/1991 | Ross | 528/60 |
| 5,069,958 | 12/1991 | Burns | 428/909 |

FOREIGN PATENT DOCUMENTS

| | | |
|---|---|---|
| 2061062 | 6/1971 | France . |
| 1165046 | 3/1964 | Germany . |
| 1099676 | 1/1968 | United Kingdom . |
| 1307230 | 2/1973 | United Kingdom . |
| 1327758 | 8/1973 | United Kingdom . |
| 1354892 | 5/1974 | United Kingdom . |
| 1400932 | 7/1975 | United Kingdom . |

OTHER PUBLICATIONS

Chamberlain, N. G., New Developments in Offset Blankets, *Professional Printer*, vol. 22, No. 6 (1979).

*Primary Examiner*—George F. Lesmes
*Assistant Examiner*—Kathryne E. Shelborne
*Attorney, Agent, or Firm*—Pennie & Edmonds

[57] ABSTRACT

A multi-ply laminated compressible printing blanket for use in offset printing comprising in order, a first compressible fabric ply, a compressible elastomeric layer, at least two additional fabric plys situated above the compressible elastomeric layer, an elastomeric subface and an elastomeric printing face deposited by a solventless process and having a surface profile adapted for reducing dot gain while enhancing the releasability of the printed matter. At least the lowermost fabric ply incorporates a protective coating to prevent wicking of inks, water and/or solvents through the blanket which might otherwise lead to swelling and delamination of the various plys. In addition, both the fabric plys and the compressible layer are at least partially coated with a matrix material having dispersed therein a plurality of closed cells formed, e.g., with the use of blowing agents or by adding thereto a plurality of expanded or expand microspheres.

16 Claims, 3 Drawing Sheets

COMPRESSIBLE PRINTING BLANKET AND METHOD OF MAKING SAME

TECHNICAL FIELD

The invention relates generally to the field of offset printing and more particularly to the manufacture of compressible printing blankets for use in offset printing presses.

BACKGROUND OF THE INVENTION

The use of so-called "printing blankets" in offset lithography has been well known for a number of years. In the process of offset lithographic printing, a rotary cylinder is covered with a printing plate having a positive image area receptive to oil-based inks and repellent to water, as well as a background area in which the opposite is true. The printing plate is rotated so that its surface contacts a second cylinder covered with a rubber-surfaced ink receptive printing blanket. The ink present on the image surface of the printing plate transfers, or offsets, to the surface of the blanket. Paper or other sheet stock to be printed is then passed between the blanket covered cylinder and a rigid back-up cylinder to transfer the image from the surface of the blanket to the paper.

During the steps in which the image is transferred from the plate to the blanket and subsequently wherein the image is transferred from the printing blanket to the paper, it is important to ensure intimate contact between the two contacting surfaces. This is ordinarily achieved by positioning the blanket covered cylinder and the supporting cylinder it contacts so that there is a fixed interference between the two. Thus, the blanket is compressed throughout the printing run to a fixed depth, typically about 0.002 to 0.006 inches. Moreover, it is also important that this compression be maintained uniformly over the entire blanket.

This fixed interference between the blanket and the paper substrate may, for example, be accomplished by inserting one or more thin layers of paper or the like between the blanket and the surface of the cylinder to build up the thickness of the blanket. This process is known as "packing" a blanket.

Conventional offset printing blankets typically include a multi-ply fabric base and a vulcanized elastomeric face. Preferably, to enhance the compressibility of such blankets, one or more cellular compressible layer(s) may be buried within or attached to the fabric between the base and the elastomeric face of the blanket. These compressible layers may be formed with, for example, a plurality of either open (see, e.g., U.S. Pat. No. 4,442,895 to Shimura) or closed (U.S. Pat. No. 4,042,743 to Larsen) cell structures distributed within an elastomeric matrix.

Compressible layers of the type described above are particularly useful in preventing the occurrence of print distortion, i.e., a lack of definition caused by a buldge/deformation which often otherwise occurs in the printing surface of the blanket adjacent to the nip of the printing press. The compressible layer also serves to absorb the effect of a "smash", which is a substantial deformation of the blanket caused by a temporary increase in the thickness of the material to be printed, such as by the accidental introduction of more than one sheet of paper between the printing blanket and the back up cylinder during the printing operation.

Blankets of the type described above suffer from a variety of deficiencies, however, which negatively affect their durability and print quality. For example, they are susceptible to caliper loss due to compression set of one or more of the following: the fabric(s) used to form the support layer(s), the elastomeric compounds used to form the face and, where included, the adhesive layers for binding adjacent blanket segments, and/or, in the case of compressible blankets, the compressible matrix. In addition, printing blankets of the type described above also frequently suffer from wicking of ink, water and solvents commonly used in a press room, through either the exposed cut edges of the blankets or, in instances where these edges are protected by the application of a sealant, directly through cracks in the blanket or the bottom ply of the fabric.

Further, in blankets having a cellular compressible layer or "ply" (these terms are used interchangeably herein) the compressible ply is typically located below a single ply of fabric or else directly below the elastomeric printing face. This arrangement exposes the compressible layer to the high stress present at the adjacent printing face of the blanket, thus reducing the smash resistance of such blankets and increasing the occurrence of wicking through the cells therein.

Additionally, the application of the elastomeric printing face on prior art blankets is typically performed with the use of a technique known as knife over roll spreading, in which the face material is first dissolved in an organic solvent prior to its application upon the fabric ply or compressible layer. Such organic solvents, however, require sophisticated environmental controls to render them safe for use in the work place.

Furthermore, prior art printing blankets are often provided with surface profiles on their elastomeric printing face which fails to strike an acceptable balance between the print quality provided by this surface and its ability to release the printed stock in preparation for accepting the next impression from the printing cylinder.

SUMMARY OF THE INVENTION

An improved multi-ply laminated printing blanket for use in offset printing has now been developed which substantially overcomes the drawbacks of the prior art blankets discussed above.

Thus, the present invention provides a printing blanket which has improved resilience and resistance to caliper loss in contrast to blankets known in the prior art. The present invention also provides a printing blanket having improved resistance to swelling and delamination caused by absorption and wicking of ink, water and solvents commonly used in a press room. Furthermore, these printing blankets can additionally provide improved smash resistance and improved packing latitude without sacrificing print quality.

In addition, the present invention provides a printing blanket having an improved resistance to cutting of the elastomeric printing face as well as to the consequent swelling and delamination which can occur as a result of such cuts, and wherein said face has a specific surface profile which reduces dot gain during printing while maintaining good release characteristics. Moreover, the present invention produces these blankets by a technique which utilizes reduced levels of processing solvents.

The present invention thus involves forming a laminated, unitary printing blanket structure comprising, in order from the bottom to the top of the blanket, at least a first compressible fabric ply, a compressible elastomeric layer having a plurality of closed cell structures distributed therein, at least two additional compressible fabric plys, an elastomeric subface and an elastomeric printing face having a profile adapted to reduce dot gain while enhancing the releasibility of the printed matter from the blanket.

The novel features of the blanket of the invention include incorporating into the bottom ply of fabric, or if desired, as many as all of the fabric plys, during the formation of the subject blanket, a protective coating, e.g., of a fluorocarbon or a silicone compound, to render these layers ink, water and solvent resistant. Optionally, a variety of commercially produced fabrics which have been treated in the manner described above are available in the market and may be utilized to avoid the necessity of the blanket manufacturer having to carry out the fabric coating process, thus permitting a reduction in the amount of capital expenditure and/or production time expended on this aspect of the invention by the blanket manufacturer during the process of forming the blanket.

Further, the side remote from the press cylinder of the lowermost fabric ply, as well as both sides of the center ply fabric and the lower portion of the top fabric ply are spread with a nitrile latex matrix containing a plurality of unexpanded, or pre-expanded thermoplastic or thermosetting microspheres in a manner such that these microspheres become thoroughly embedded within the interstices of the sides of these fabrics which are coated.

The thus coated fabric plys are then passed through an oven at a temperature sufficient to cause complete expansion of the microspheres in order to lock the matrix into the fabric, before being bonded to the other plys which comprise the blanket of the invention.

Moreover, in contrast to compressible printing blankets produced in the prior art, wherein the compressible layer was positioned under a single (non-compressible) fabric ply or directly under the face, the compressible layer of the blanket of the present invention is located under not just one, but at least two plys of compressible fabric. Thus, the compressible layer is protected from the relatively high stresses present at locations within the blanket more closely adjacent to the printing face and is therefore able to provide both increased smash resistance and increased wicking resistance to the blanket structure.

Further, the blanket of the invention additionally comprises a high durometer, high tensile low elongation nitrile layer as a subface which is positioned between the top fabric ply and the printing face. This subface enhances the physical properties of the top fabric ply, thus improving the stability and resistance to cutting of the print face located directly above.

In addition, the printing face is preferably applied to the blanket without the use of solvents, i.e., by calendering, thus substantially eliminating the need for sophisticated and costly environmental controls which are required in prior art blanket forming processes that utilize solvent processing techniques. Furthermore, after curing, the print face is buffed to produce an average surface roughness of above about 0.6 μm but below about 0.95 μm, and preferably between about 0.7 to 0.9 μm, thus enhancing the release properties of the blanket while providing improved dot constriction over that which is presently available with the use of prior art blankets.

Other details, features, objects, uses and advantages of this invention will become apparent from the embodiments thereof presented in the following specification and claims, as well as in the enclosed drawing.

DETAILED DESCRIPTION OF THE PREFERRED EMBODIMENTS

Figure 1:
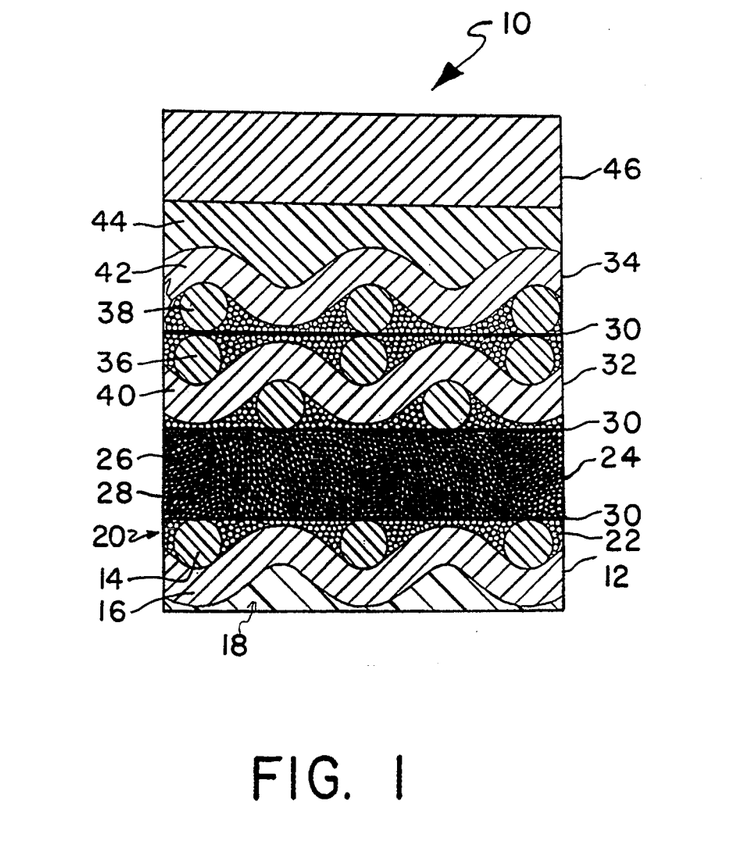
FIG. 1 is a sectional view, greatly enlarged, through a laminated compressible printing blanket manufactured according to the present invention.

As illustrated in FIG. 1, printing blanket 10 of the present invention is comprised of several plys laminated into a single unitary structure. For convenience in understanding the invention, each of these plys, together with their associated features, will be discussed below in turn.

For purposes of the present discussion, the terms "bottom", "lower" and the like are used to refer to that portion of an individual ply or stack of plys which is most nearly adjacent the printing cylinder upon which the blanket of the invention is installed. Conversely, the "top" or "upper" portion of a single ply or stack of plys is that portion thereof which is located or positioned furthest from the printing cylinder.

The lowermost ply 12 of blanket 10 incorporates a novel fabric substrate which imparts improved resistance to lateral distortion, as well as wicking due to transport of solvent or gas, and caliper loss, while also improving the compression set, resilience, reboundability, smash resistance and compressibility properties of the blanket.

The fabric substrate of ply 12 is comprised of warp fibers 14 and fill fibers 16, which are formed of natural or synthetic material. These fibers may be woven or non-woven and produced from spun or filament yarn of the desired length. Cotton, polyester, nylon and rayon are typical materials which may be used as fibers or yarns of the fabric substrate of ply 12.

Preferably, the warp fibers are formed from natural material such as cotton, whereas the fill fibers are comprised of a synthetic textile such as, e.g., rayon. Both the warp and fill fibers or yarns should have a tensile strength of at least 30 psi. The substrate preferably has a yarn count per inch ranging between about 55–61 (warp) and 57–63 (fill). The fabric substrate ranges between about 5.8 to 6.2 ounces/sq. yd. in weight and from 0.014 to 0.016 inches in thickness (also referred to as "gauge"). The warp direction has a tensile strength of at least about 150 pounds/inch whereas that of the fill direction is at least about 60 pounds/inch. Moreover, in the preferred embodiment, the fabric substrate should be capable of no more than about 1.9% residual stretch.

Fabrics suitable for use in the present invention (in addition to those set forth in the Example provided below detailing the best known mode of practicing the invention) include, but are not limited to, those disclosed in U.S. Pat. No. 4,042,743 to Larsen et al., the disclosure of which is expressly incorporated herein by reference thereto. In general, in the fabric plys used in the present invention, the fiber or yarn counts per inch for both warp or fill directions can vary between 20 and 150, depending upon the denier of the fiber or yarn. Moreover, fabric weights of 2 to 8, preferably about 4 to 8, ounces per square yard and thicknesses of 0.005 to 0.03" can be utilized for particular applications of the various fabric plys of this invention.

Lowermost fabric ply 12, as well as intermediate fabric plys 32 and 34 (discussed below), are each dipped in and thoroughly saturated with a coating material 18 to render these plys ink, water and solvent repellant. In particular, the coating material is selected to meet certain non-wicking test requirements. The fabric wicking test is carried out by covering the fabric, as described above, with the non-wicking coating material, applying a quantity of a solvent to a lower edge thereof and determining the upward distance (in mm.) that the solvent travels in one hour within the fabric. The solvents tested with the procedure outlined above include water, ronolene and toluene. Most preferably, there should be no wicking of these solvents at all within the fabric. However, penetration by toluene of up to about twenty (20) mm and about 5 mm by ronolene has been found to still provide acceptable results with the use of such coated fabrics in the printing blanket of the invention. Many fabric manufacturers are able, as discussed below, to provide satisfactory coatings which meet or exceed these requirements.

This coating treatment, described below in further detail, does not have any significant effect upon the coefficient of friction between the inner surface of blanket 10 and the outer face of the printing cylinder and thus does not appreciably increase wear on blanket 10 caused due to the rotation of the printing cylinder. Thus no special compounding and/or curing is required in the case of bottom fabric ply 12.

The coating material is preferably a fluorocarbon having either a solvent or water base and is of such low viscosity, i.e., essentially the same as water, that complete penetration of the fabric plys so treated is possible. This coating treatment effectively eliminates the possibility of wicking, e.g., of inks, water and/or solvents through interior channels within the fabric. Thus it is no longer necessary, as practiced in the prior art, to seal the edges of the blanket to prevent wicking from the open, cut edges. Alternately, however, numerous other treating materials, such as silicone compounds having similar water and solvent-resistant properties, may be utilized in place of the fluorocarbon material.

As non-limiting examples, a number of useful fluorocarbon and silicone coating compounds are set forth in Japanese patent publication No. 2116597 published May 1, 1990, the disclosure of which is expressly incorporated herein by reference. These materials include AG (i.e., "Asahi Guard") 310, 340, 530, 550, 640, 650, 710, 730, 740, 780, 800; S (i.e., "Surflon") 111, 112, 113, 121, 131, 132, 141, 145, 381, 382, all of which are products of Asahi Glass Co., Ltd.; "Unidyne" DS-101, 102, 202, 301, 401, 402, 501, 502 (produced by Daikin, Ltd.); "Paraguard" L80, 30, 61, 0-400, 650, F-5 (produced by the Oh-hara Palladium Chemical Co; Ltd.); "New-Stecker" AR 10, SWR, WR 40, WR 44, WR 50, NK Guard (produced by Nikka Chemical Industrial Co., Ltd.) and, "Solvent" TX, a product of Hoeschst Japan, Ltd.

The coating material(s) chosen for use with the invention may, for example, be applied before the various plys are laminated together to form blanket 10 by first impregnating these plys with the coating material and then drying the coated fabric by methods known in the art. Alternately, the coating finish may be applied after blanket 10 is formed with the use, e.g., of means such as a roll coater, a sprayer, a brush, or the like.

As noted above, "standard" fabrics, i.e., those typically used in forming fabric plys for offset printing blankets, are available with a protective coating as described above from numerous textile manufacturers, including Wamsutta, a division of Springs Industries, Inc. and Technofabric S.p.A. Capital expenditures and production time may therefore be minimized on the part of blanket manufacturers by using such fabrics to form the fabric plys, rather than incorporating a coating step as described above into the blanket manufacturing process. However, although as noted above such coated fabrics are known in the art, they have not previously been used in the production of compressible printing blankets of the type described herein.

Fabric ply 12 is additionally spread coated, calendared, dipped or otherwise contacted, upon only its upper surface, however, with a matrix material 20. Suitable matrix materials include thermoplastic resins, thermosetting resins, polyurethanes, and natural or synthetic elastomers. PVC and other polyolefins are suitable thermoplastic resins, while preferred polyurethanes, having improved hydrolytic stability, are disclosed in U.S. Pat. Nos. 5,001,208 to Damewood et al. and 5,013,811 to Ross et al. The content of each of these patents is expressly incorporated herein by reference thereto. One skilled in the art is aware of a variety of techniques for applying these matrix materials in liquid form (i.e., by a solvent solution or a latex dispersion) to a fabric substrate.

The elastomers best suited for use in this invention are of the acrylonitrile, neoprene, and acrylic families. Polysulfides, alone or in combination with acrylonitrile or neoprene, can also be used. Any natural or synthetic elastomer can be used if desired, and such materials are preferred for use with the invention.

As noted above, the elastomer may be applied to the fabric as a latex dispersion or by a solvent carrier. Latex cements of these elastomers are preferred. The elastomer most preferred for forming the matrix is a self-curing nitrile latex elastomer having a total solids content of between about 30–60%, preferably between about 45–50% and most preferably about 47%. The pH of this material should be slightly acidic, i.e., preferably in the range of about pH 6–7. The preferred viscosity for the matrix material ranges between about 14,000 to 20,000 cps and is most preferably about 15,000 cps.

The matrix material used with the fabric plys additionally contains a plurality of cells therein in an amount sufficient to impart increased compressibility to the fabric. In a first embodiment, the cells may be closed cells formed with the use of a plurality of microspheres. Generally, the microspheres are formed from materials such as, e.g., thermoplastic resins, thermosetting resins, ceramics, glass and sintered metals. A preferred thermosetting resin for forming the microspheres used in the invention is a phenolic resin having a density of between about 0.01 and 0.05 grams per cubic centimeter. The microspheres range in diameter between about 1–200 and preferably 50–130 microns, with an average size of about 90µ being most preferred. They are dispersed relatively uniformly throughout the matrix material such that, upon application of the matrix to the fabric ply, they become thoroughly embedded in its interstices. Thus, when applied, the microsphere loaded material described herein will substantially impregnate and encapsulate the fabric substrate on its upper side.

Generally, the microspheres are uniformly distributed throughout the elastomer in such a way as to avoid any appreciable crushing of the microspheres. Additionally, the microspheres are incorporated in the elastomeric material at a loading of about 4–90% and preferably 10–70% of the solid contents. This percentage will vary based on such factors as microsphere dimension, wall thickness and bulk density, or if blowing agents are additionally incorporated within the matrix.

To form the cells in the embodiment described above, any of a wide variety of microspheres 22 can be added to a solution or dispersion of the matrix. If solvent solutions are utilized, the selected microspheres must be resistant to chemical attack from the solvents.

Several acceptable types of thermoplastic microspheres for use with the present invention are marketed, for example, by Expancel and Pierce & Stevens. Microspheres of a thermoplastic resin are preferred for this embodiment.

Once the microspheres are dispersed in the matrix and the matrix is applied to the fabric substrate, the thus coated fabrics are then, for example, passed over hot cans or festooned or passed through an oven at a temperature sufficient to cause complete expansion of the microspheres so that the matrix becomes locked into the fabric. During this so-called "expansion pass", additional coatings for particular applications may also be applied to the fabric substrates. Alternately, however, if pre-expanded microspheres are utilized in treating the fabric, the heating step described above may be eliminated.

If desired, the microspheres may further include a coating thereon to facilitate their bonding with the matrix material. Pierce & Stevens markets microspheres under the trade name DUALITE, which includes any one of a variety of coatings thereupon, such as talc, calcium carbonate, zinc oxide, titanium dioxide, mica, calcium sulfate, barium sulfate, antimony oxide, clay, silica, and aluminum trihydrate. Proper selection of the sphere/coating composite further enhances the bonding between the fabric and the elastomer matrix. U.S. Pat. No. 3,615,972 to Morehouse, the disclosure of which is incorporated herein by reference, discloses a number of techniques used in manufacturing microspheres of the type suitable for use in the present invention.

In an alternate embodiment, cells may be formed in the matrix by mechanically inducing air into a matrix forming material before it is applied to the fabric, such as by aerating or stirring. Another means of creating cells is to use chemical blowing agents (the term foaming agents also is used) that are decomposable into gases as they are cured in a compound. One such class of blowing agents are the Cellogens ™ which are manufactured by Uniroyal (Cellogen is a registered trademark of Uniroyal). Cellogens are decomposable in the presence of heat, which may be applied during curing. Many other types of blowing agents are commercially available with a wide range of decomposition characteristics, such as those set forth in U.S. Pat. No. 4,548,858 to Meadows (see, e.g., col. 4, lines 53–66), the disclosure of which is expressly incorporated herein by reference.

The compressible fabric ply described above is particularly useful in applications such as the presently disclosed printing blanket in that, as is well known, space is at a premium within a printing blanket and thus the limited dimensions available to the various plys of such blankets severely limits the structural options available to designers of such blankets. It has now been found that at least a portion of the compressibility, previously provided mainly by the compressible polymer ply, may be transferred to the fabric plys, thus permitting a concurrent reduction in the size of the associated compressible layer.

Located directly above fabric ply 12 is compressible layer 24. Layer 24 comprises a plurality of closed cells 26 embedded within a binder 28. Cells 26 resist the greater and more permanent deformation within blanket 10 which would otherwise occur in the absence of such a layer.

Binder 28 is made from a suitable resilient polymer matrix, into which a quantity of cell-forming materials are evenly dispersed to form a compound. These cell-forming materials may be selected from the same materials used to form the cells in fabric ply 12, i.e., microspheres (coated or uncoated) and/or blowing agents. As matrix materials, elastomers are preferable with a neoprene/nitrile blend being most preferred.

Typically the compound is applied to fabric ply 12 to form the compressible layer thereupon by depositing a number of thin layers in successive applications. Layers of about 0.002 inches are a suitable thickness for this application.

Compressible layer 24 may be adhered to fabric ply 12 with, for example, the use of a layer of a suitable adhesive 30. Adhesive 30 is preferably a compounded nitrile rubber but a variety of water and solvent based elastomeric adhesives, which are well known in the art may be used, if desired, in its place. The particular adhesive will depend upon the specific elastomers utilized to form the plys. This bonding may alternately or additionally be effected by a chemical reaction occurring between fabric ply 12 and the compound triggered during the subsequent curing process. Still further, compressible layer 24 may alternately be formed by applying the compound to a release layer, curing the composition, stripping the cured compound from its release layer and adhering ply 24 to fabric ply 12 with the use of an adhesive layer 30. The compound may also be applied to fabric ply 12 by extrusion or calendaring. Alternately, if desired, compressible layer 24 may be applied to the lower portion of a fabric ply 32 (discussed below) which is positioned directly above layer 24, instead of to the upper portion of fabric ply 12 as described above.

Located directly above compressible ply 24 is a multi-ply intermediate fabric stack comprising at least two fabric plys. For convenience in describing the invention, blanket 10 is shown in FIG. 1 with two fabric plys 32, 34, i.e., respectively a "center" and a "top" fabric ply, but this arrangement should not be viewed as limiting the invention since additional fabric plys (i.e., more than 2) may be incorporated at this location if desired for a particular application. Plys 32 and 34 are bonded each to the other and to compressible layer 24 with the use of a suitable adhesive 30 such as a compounded nitrile rubber.

Prior art compressible printing blankets have typically been constructed with the compressible ply being located under a single ply of fabric or directly under the printing face. An additional novel feature of the present invention which should be noted is that compressible layer 24 is located under at least two plys of fabric, i.e., 32 and 34, said plys being discussed in further detail below. This arrangement protects compressible layer 24 from the higher stresses typically found at the printing surface of such blankets, thus providing an enhanced degree of smash resistance to blanket 10, as well as increased resistance against the wicking of liquids through the cells.

Fabric plys 32 and 34 are similar in many respects to fabric ply 12 discussed above in that the fabric substrate of plys 32 and 34 is comprised of warp fibers 36, 38 and fill fibers 40, 42, respectively, formed of natural or synthetic material. These fibers, as in the case of ply 12, may be woven or non-woven and comprise spun or filament yarn of the desired length. Preferably, the warp fibers are formed from natural material such as cotton whereas the fill fibers are comprised of a synthetic textile such as, e.g., rayon. Both the warp and fill fibers or yarns should have a tensile strength of at least about 30 psi.

In a preferred embodiment, center ply 32 has a yarn count per inch ranging between about 75–80 (warp) and 53–58 (fill). The corresponding values for top ply 34 are respectively, 100–105 (warp) and 77–82 (fill). The fabric used to form ply 32 ranges in weight between about 4.9 to 5.3 ounces/sq. yd., whereas that used in top ply 34 is between about 3.7 and 3.9 ounces/sq. yd. The thickness, i.e., gauge, of ply 32 ranges between about 0.0105 and 0.0115 inch while that of top ply 34 is between about 0.008 and 0.010 inch. The warp direction of center ply 32 has a tensile strength of at least about 150 pounds/inch whereas the corresponding value for top ply 34 is at least about 70 pounds per inch. The tensile strength in the fill direction of ply 32 is at least about 40 pounds per inch, whereas that of ply 34 is at least about 60 pounds per inch. In center ply 32, the fabric should be capable of no more than about 2.2% residual stretch, while the stretch of the top fabric ply 34 may range between about 6 and 10%.

Particularly useful fabrics for forming plys 32 and 34 are set forth in the Example provided below, although the invention should not be construed as being limited to these materials. Moreover, in place of the fabrics used to form both fabric substrate 12 as well as plys 32 and 34, one could utilize a variety of alternate substrate materials such as porous plastic, paper or rubber sheets having the appropriate stretch and tensile strength. Plys 32 and 34 are positioned in adjacent face relation, with ply 32 moreover being in adjacent face relation with compressible layer 24.

A distinguishing feature between center ply 32 and top ply 34 is that, in center ply 32 both sides of the fabric are impregnated with a cell-forming material, i.e., preferably a plurality of microspheres evenly distributed within a matrix. In contrast, in top ply 34, only the bottom, i.e., lowermost, portion of the fabric is so treated, in a manner similar to that of fabric ply 12 which is also treated on only one side. When both sides of a fabric (such as center ply 32) are to be coated, the preferred method of application of the microsphere loaded matrix material is by use of a dip tank and squeeze rolls. Optionally, one or both of fabric plys 32 and 34 may be first thoroughly treated with a coating 18 of, e.g., a fluorocarbon or a silicone compound to render them ink, water and solvent repellant.

With the use of the dip tank technique, the fabric substrate is fed through a dip tank containing the elastomeric/microsphere mixture and subsequently through squeeze rollers to force the liquid into the fabric. The elastomer/microsphere coated fabric is then dried and/or vulcanized according to conventional methods to form a compressible fabric which is bound to fabric ply 34 by adhesive layer 30 before the multiply fabric stack of plys 32, 34 is laminated to compressible layer 24.

Bonded to the upper portion of top fabric ply 34 is elastomeric subface 44 formed from a high durometer, high tensile, low elongation compound (i.e., in comparison to the material used to form the printing face, as described below), which is preferably a compounded nitrile rubber. Alternately, however, a variety of water and solvent based elastomeric compounds, well known in the art, may be used instead of nitrile rubber in forming the subface. Subface 40 is provided to enhance the physical properties of top fabric ply 34 and thereby to enhance the stability of the printing face, thus resulting in improved print quality. In addition, the subface also serves to improve the resistance of the printing face to cutting while in use and thus blanket 10 is less susceptible to the consequent swelling and delamination which otherwise often occurs when liquids such as inks, oils and solvents enter blanket 10 through cuts in the printing face.

Elastomeric printing face 46, adapted to accept the print image from the printing plate and transfer it to, e.g., a paper substrate, is the uppermost layer on laminated blanket 10. In prior art blankets, the application of the elastomeric printing face was typically carried out by the well known method of knife over roll spreading in which a solvated elastomeric compound is spread in numerous successive passes, applying a thickness of about 0.001" with each pass, over, e.g., a subface or upper fabric layer.

Blanket 10 of the present invention differs, however, from the prior art in that, in the invention, the face, comprised of an elastomeric compound, is applied without the use of solvents. Moreover, the face is also applied directly to the subface in a single pass by a process such as calendaring. This method provides obvious advantages of improved efficiency and a reduced need for environmental controls due to the absence of organic solvents.

Moreover, as pointed out above, in comparison to the material used to form the subface, the elastomeric material used to form the printing face is lower in durometer and tensile strength and higher in elongation. That is, the subface of the present invention preferably has a compression set at least about 3 times lower than that of the printing face, with a 3–5 times improvement in tensile strength compared to the printing face, and a hardness value of at least about 10–12 points higher than the face, as measured on the Shore A scale.

In addition, printing blankets of the type described above are typically provided with a roughened surface profile in an effort to reduce dot gain while maintaining good release properties for the blanket. Such roughness profiles have, in the past, been produced either by molding during cure or by buffing the cured face with medium or coarse grit sandpaper, which is well known in the art. The surface profile is thereafter measured by, e.g., a device known as a profilometer (manufactured by the Perthen Corporation), which is also well known in the art. The surface profiles of prior art laminated blanket printing faces typically have a roughness average (i.e., "RA") of 1.0 to 1.8 μm while cast blankets, which do not have good release properties, typically have an RA of 0.3 to 0.5 μm. In this regard, it is important to note that the higher the roughness average, the worse the print quality becomes due to decreasing uniformity of the dots.

In blanket 10 of the present invention, however, the roughness average of printing face 42 is adjusted to above about 0.6 μm but below about 0.95 μm, and preferably between about 0.7 to 0.9 μm by buffing with fine sandpaper. The advantage of this treatment is that it affords excellent release properties to the blanket while also resulting in an improved structure of the printed dots, thus providing both improved print quality and releasability to the blanket of the invention. Alternately, this effect may also be achieved by a number of alternate methods well known in the art, such as molding.

EXAMPLES

The following non-limiting Examples are provided solely for the purpose of illustration and are not to be construed as limiting the invention in any manner.

Example I

The Example set forth below describes particular steps and materials for use in practicing the best known mode of the invention taught herein.

TABLE I

| | | FABRICS | | |
|---|---|---|---|---|
| | | Bottom Ply | Center Ply | Top Ply |
| 1. | Yarn Composition | Warp: 20/2 ply Long Staple Cotton | 30/2 ply Long Staple Cotton | 36.5 Singles 50/50 Polyester/Cotton Blend |
| | | Fill: 20/1 ply High Wet Modulus Rayon | 30/1 ply High Wet Modulus Rayon | 37.5 singles 50/50 Polyester/Cotton Blend |
| 2. | Yarn Count | Warp: 58/inch Fill: 56/inch | 76/inch 55/inch | 102/inch 79/inch |
| 3. | Weight | 6.0 ± 0.2 oz./yd.$^2$ | 5.1 ± 0.2 oz./yd.$^2$ | 3.8 ± 0.1 oz./yd.$^2$ |
| 4. | Gauge | 0.015" ± 0.001" | 0.011" ± 0.0005" | 0.009" ± 0.001" |
| 5. | Tensile Strength (lbs/in.) | Warp: ≧160 Fill: ≧60 | ≧150 ≧40 | ≧270 ≧60 |
| 6. | Residual Stretch | ≦1.9% | ≦2.2% | 6–10% |
| 7. | Finish | Fluorocarbon treated | — | — |

TABLE II

| FABRIC TREATMENT | |
|---|---|
| Cell Producing Media: | F-80 SD Microspheres (produced by Matsumoto Yushi-Seiyaku Co., Ltd.) |
| Binder: | Compounded Nitrile Latex |

TABLE III

| COMPRESSIBLE LAYER | |
|---|---|
| Cell Producing Media: | UCAR BJO-093 Phenolic Microspheres (produced by Union Carbide) |
| Matrix: | Compounded Nitrile Rubber |

TABLE IV

| OTHER COMPOUNDS | |
|---|---|
| Adhesive: | Compounded Nitrile Rubber |
| Subface: | Compounded Nitrile Rubber |
| Face: | Nitrile/Polysulfide Blend |

In forming printing blanket 10 with the materials described above, the unexpanded microspheres (i.e., F-80 SD) were dispersed within the nitrile latex used to form the binder for the fabric plys at a loading of 6% by dry weight of binder. One side of each of bottom fabric ply 12 and top fabric ply 34, as well as both sides of center fabric ply 32, were given two passes of the latex mixture on a knife over roll spreader and passed through a spreader oven at a speed and temperature sufficient to dry, but not cure, the latex. The resultant coated fabric plys were then passed once again through the spreader oven at a temperature sufficient to simultaneously expand the microspheres and cure the latex. Fabric plys 32 and 34 were adhesively joined and then laminated, together with fabric ply 12, with the compressible layer 24, by methods well known in the art. Thereafter the subface and face compounds were applied to the top fabric ply, with the face being calendared onto the subface. The completed composite was then cured in the normal manner and the face was buffed to a surface roughness of between about 0.7 to 0.9 μm with a 400 grit sandpaper. The improved compressible printing blanket 10 thus produced was found to overcome substantially all of the drawbacks discussed above which were associated with prior art printing blankets.

Examples 2 and 3, below, illustrate the improvement in smash protection provided by interposing at least two fabric plys between the compressible layer and the elastomeric printing face within a printing blanket of the type described herein.

Example 2

Figure 2:
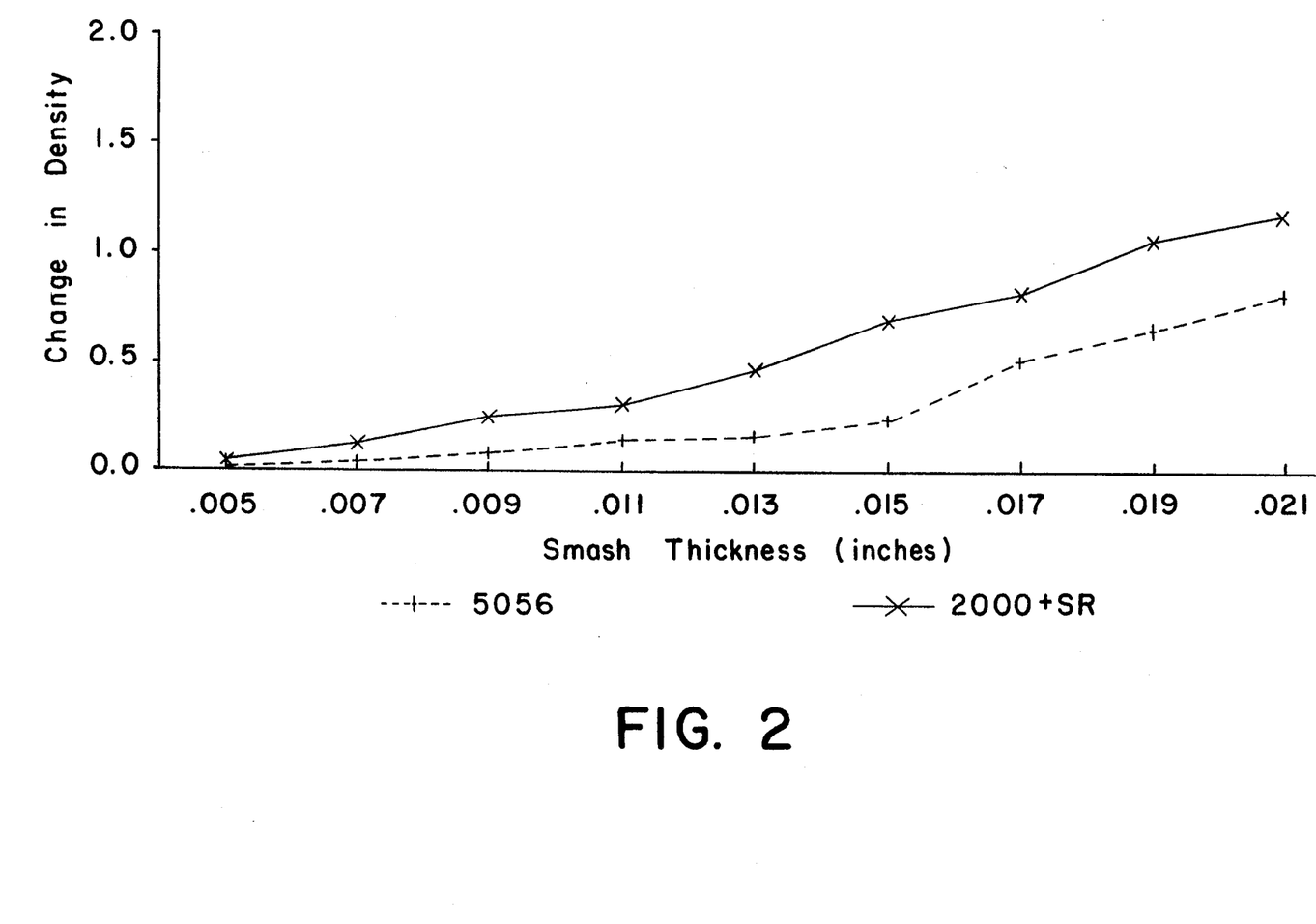
FIG. 2 is a graph illustrating and comparing the smash test results obtained with a prior art printing blanket (i.e., the 2000+SR blanket) versus a blanked produced according to the invention (i.e., the 5056 blanket)

FIG. 2 graphically illustrates the results obtained in a smash test comparison between a type 5056 printing blanket produced according to the present invention and a type 2000+SR blanket produced according to the prior art. That is, the 5056 blanket comprises, from top to bottom, a printing face, a subface, two intermediate fabric plys, a compressible layer and a base fabric ply. In contrast, the prior art 2000+SR blanket comprises only a printing face, a single intermediate fabric ply, a compressible layer and a base ply formed of two fabric layers. In both blankets, i.e., the 5056 of the invention and the prior art 2000+SR, the compressible layer was formed with the use of the well known salt leaching technique. The 5056 blanket thus differs from the 2000+SR in two respects, i.e., the compressible layer of the 5056 is protected by two fabric plys, and this blanket is further provided with a subface, in contrast to the 2000+SR blanket which lacks such a subface.

The improved performance, i.e. increased smash resistance, offered by the 5056 blanket over that of the 2000+SR is therefore clearly illustrated upon a review of FIG. 2 in that the change in density for the 5056 blanket is significantly lower (as the smash thickness increases) than is achieved for the prior art 2000+SR blanket. This improved smash resistance leads ultimately to improved printing performance by the 5056 blanket over that offered by the 2000+SR, which is, of course, one of the objects of the present invention.

Example 3

Figure 3:
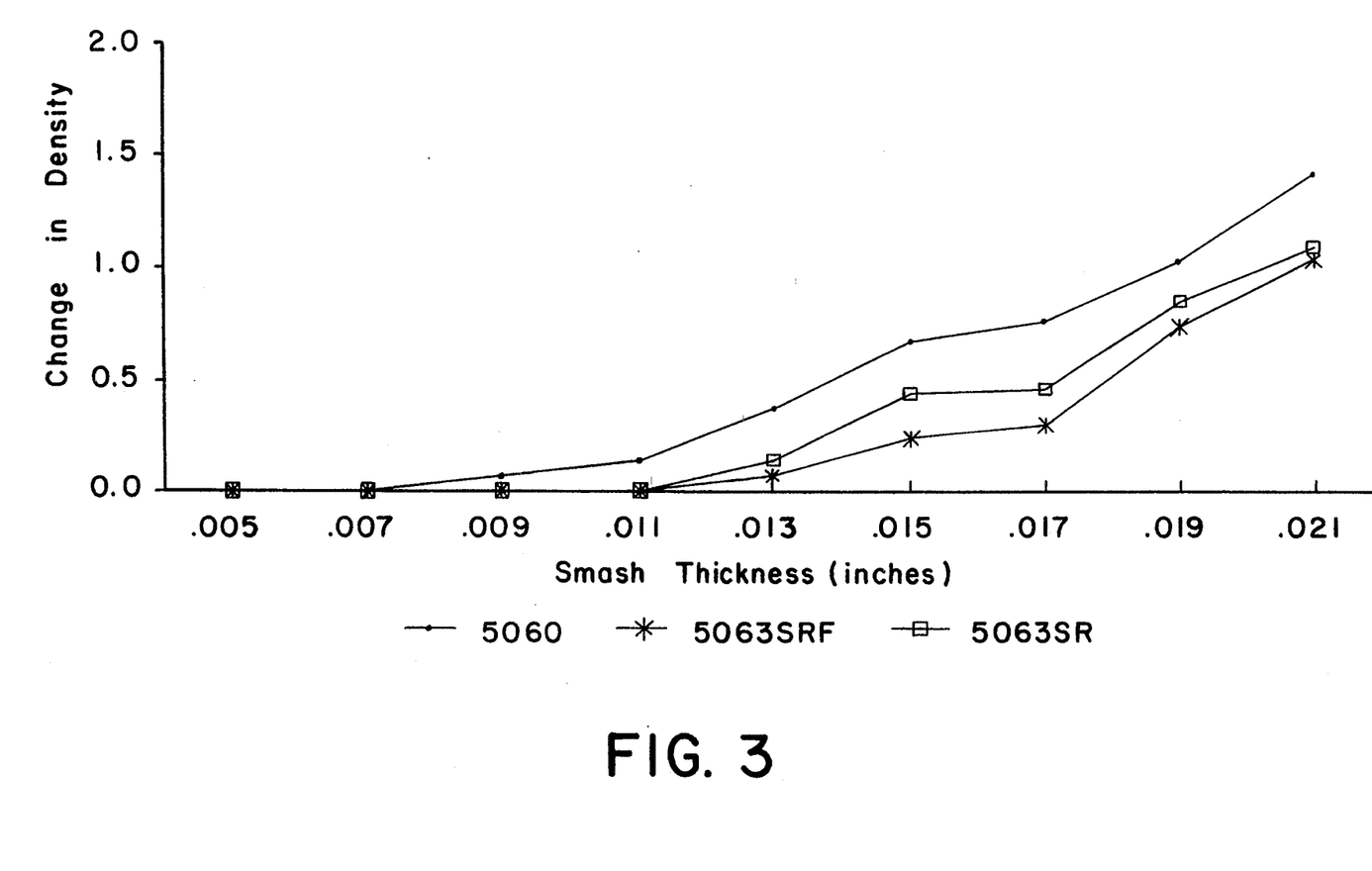
FIG. 3 graphically illustrates and compares the results of smash tests carried out between a prior art blanket (i.e., the 5060 blanket) and two variations of the blanket of the invention (the 5063 SR and 5063 SRF blankets).

FIG. 3 graphically displays the results obtained in a second set of smash test comparisons. The 5060 blanket is similar in configuration to the 2000+SR blanket discussed in Example 2 (i.e., the compressible layer is positioned beneath a single fabric layer), except that the compressible layer is formed with the use of a plurality of expanded microspheres. In addition, the 5063 SR and 5063 SRF comprise the same layers as the 5056 blanket described above, i.e., there are at least two fabric plys between the compressible layer and the printing face. Although both the 5063 SR and 5063 SRF comprise a compressible layer formed with micropheres, the two blankets differ in that the 5063 SRF blanket is provided with a surface profile according to the present invention, i.e., having an RA (roughness average) of above about 0.6 μm but below about 0.95 μm, while the 5063 SR blanket lacks such a surface profile.

A review of FIG. 3 readily demonstrates that the best results, i.e., in terms of improvement in smash resistance, were obtained, first, by the 5063 SRF blanket, then the 5063 SR blanket, with the (prior art) 5060 blanket having the least acceptable performance. Thus, the 5063 blanket of the invention, in both its SRF and SR embodiments, has been shown to provide improved performance (in terms of smash resistance) in comparison to prior art blankets.

It is noted that the above description is merely illustrative of the invention, and other parameters and embodiments may be used without departing from the inventive concept herein. Accordingly, the present invention is only limited by the claims appended hereto.

We claim:

1. A printing blanket comprising, in order:
   a first compressible fabric ply comprising a plurality of warp and fill fibers or yarns forming a fabric substrate, said substrate having an upper and a lower surface, wherein said substrate is substantially impregnated on only the upper surface thereof with a binder material containing a plurality of cells therein in an amount sufficient to impart increased compressibility properties to the first fabric ply and wherein said binder material fills the interstices of the fabric substrate substantially in the area nearest the upper surface thereof, and further wherein at least the lower surface of said substrate has a protective coating thereupon to prevent adsorption and wicking of water, inks and solvents through said ply;
   an intermediate compressible layer comprising a polymer matrix having a plurality of closed cells distributed substantially uniformly therein such that said layer has substantially uniform compression characteristics;
   a first adhesive layer securing said intermediate compressible layer to a second fabric ply;
   a second compressible fabric ply, having an upper and a lower surface, said second ply being substantially entirely impregnated with said binder material containing said plurality of cells, wherein said binder material fills the interstices of said second ply substantially entirely throughout said ply;
   a second adhesive layer securing said second ply to a third compressible fabric ply;
   a third compressible fabric ply, having an upper and a lower surface, said third ply being substantially impregnated only upon said lower surface with said cell-containing binder material, wherein said binder material fills the interstices of said third ply substantially in the area nearest the lower surface thereof;
   a subface formed from a high durometer, high tensile, low elongation elastomeric compound; and
   an elastomeric printing face having a surface profile with a roughness average of above about 0.6 but below about 0.95 microns.

2. The blanket of claim 1 which further comprises a third adhesive layer interposed between said first compressible fabric ply and said intermediate compressible layer for securing said first ply and said intermediate layer.

3. The printing blanket of claim 1 wherein the cells are formed from microspheres having a diameter of between about 1 and 200 microns which are dispersed relatively uniformly throughout the binder material.

4. The printing blanket of claim 3 wherein the microspheres are formed from a material selected from the group consisting of thermoplastic resins, thermosetting resins, ceramics, glasses and sintered metals.

5. The printing blanket of claim 3 wherein the microspheres further comprise a surface coating to facilitate bonding with the binder material.

6. The printing blanket of claim 3 wherein the microspheres are present in the binder material at a loading of about 4 to about 90% by dry weight of the binder material.

7. The printing blanket of claim 1 wherein the cells are formed from gas bubbles trapped within the binder material.

8. The printing blanket of claim 1 wherein the binder material is a thermoplastic resin, a thermosetting resin, a polyurethane or a natural or synthetic elastomer.

9. The printing blanket of claim 8 wherein the elastomer is a nitrile, a neoprene or an acrylic elastomer.

10. The printing blanket of claim 1 wherein the warp fibers or yarns have a tensile strength of at least about 150 pounds per inch, the fill fibers or yarns have a tensile strength of at least about 60 pounds per inch and the fabric substrate has a weight of between about 4 and 8 ounces per square yard.

11. The printing blanket of claim 1 wherein said polymer matrix is a flexible thermoplastic or elastomeric material.

12. The printing blanket of claim 11 wherein said matrix is a compounded nitrile rubber.

13. The printing blanket of claim 1 wherein said protective coating upon said first compressible fabric ply comprises a fluorocarbon or a silicone material.

14. The printing blanket of claim 1 wherein the cells are formed by microspheres of a phenolic resin having a diameter of between about 50 and 130 microns.

15. The printing blanket of claim 14 wherein said microspheres are dispersed in the binder material at a loading of about 6% by dry weight of the binder material.

16. A printing blanket comprising, in order:

a first compressible fabric ply comprising a plurality of warp and fill fibers or yarns forming a fabric substrate wherein the warp fibers or yarns have a tensile strength of at least about 150 pounds per inch, the fill fibers or yarns have a tensile strength of at least abut 60 pounds per inch and the fabric substrate has a weight of between about 4 and 8 ounces per square yard, said substrate having a lower and upper surface, wherein said substrate is substantially impregnated on only the upper surface thereof with a binder material selected from the group consisting of a thermoplastic resin, a thermosetting resin, a polyurethane or a natural or synthetic elastomer, said binder material containing a plurality of cells therein in an amount sufficient to impart increased compressibility to the fabric ply and wherein said binder material fills the interstices of the fabric substrate substantially in the area nearest the upper surface thereof, and further wherein at least the lower surface of said substrate has a protective coating thereupon to prevent adsorption and wicking of water, inks and solvents through said ply, wherein said protective coating comprises a fluorocarbon or a silicone material;

an intermediate compressible layer comprising a polymer matrix formed from a flexible thermoplastic or elastomeric material, wherein said matrix has a plurality of closed cells distributed substantially uniformly therein such that said layer has substantially uniform compression characteristics;

a first adhesive layer securing said intermediate compressible layer to a second fabric ply;

a second compressible fabric, ply, having an upper and a lower surface, said second ply being substantially entirely impregnated with said binder material containing said plurality of cells, wherein said binder material fills the interstices of said second ply substantially entirely throughout said ply;

a second adhesive layer securing said second ply to a third compressible fabric ply;

a third compressible fabric ply, having an upper and a lower surface, said third ply being substantially impregnated only upon said lower surface with said cell-containing binder material, wherein said binder material fills the interstices of said third ply substantially in the area nearest the lower surface thereof;

a subface formed from a high durometer, high tensile, low elongation elastomeric compound; and an elastomeric printing face having a surface profile with a roughness average of above 0.6 but below about 0.95 microns.

* * * * *

UNITED STATES PATENT AND TRADEMARK OFFICE
CERTIFICATE OF CORRECTION

PATENT NO. : 5,364,683
DATED : Nov. 15, 1994
INVENTOR(S) : Flint et al.

It is certified that error appears in the above-indentified patent and that said Letters Patent is hereby corrected as shown below:

Column 10, line 21, change "40" to --44--;

Column 11, line 11, change "42" to --46--;

Column 14, line 21, please change claim 10 to read:

10. The printing blanket of claim 1 wherein the warp fibers or yarns <u>provide the fabric with</u> [have] a <u>warp</u> tensile strength of at least about 150 pounds per inch, the fill fibers or yarns [have] <u>provide the fabric with</u> a <u>fill</u> tensile strength of at least about 60 pounds per inch and the fabric substrate has a weight of between about 4 and 8 ounces per square yard.

Signed and Sealed this

Fifth Day of December, 1995

Attest:

BRUCE LEHMAN

Attesting Officer     Commissioner of Patents and Trademarks